(12) United States Patent
Magnusson

(10) Patent No.: US 9,101,157 B2
(45) Date of Patent: Aug. 11, 2015

(54) PACKAGING LAMINATES BASED ON CARDBOARD AND PAPER

(75) Inventor: Katarina Magnusson, Sodra Sandby (SE)

(73) Assignee: TETRA LAVAL HOLDING & FINANCE SA, Pully (SE)

(*) Notice: Subject to any disclaimer, the term of this patent is extended or adjusted under 35 U.S.C. 154(b) by 0 days.

(21) Appl. No.: 10/612,445

(22) Filed: Jul. 2, 2003

(65) Prior Publication Data

US 2005/0260366 A1  Nov. 24, 2005

Related U.S. Application Data

(63) Continuation-in-part of application No. 08/983,588, filed as application No. PCT/SE96/00829 on Jun. 25, 1996, now abandoned.

(30) Foreign Application Priority Data

Jul. 3, 1995 (SE) .................................. 9502393-3

(51) Int. Cl.
*A23L 3/10* (2006.01)
*B32B 27/10* (2006.01)
*D21J 1/08* (2006.01)
*B65B 55/10* (2006.01)

(52) U.S. Cl.
CPC . *A23L 3/10* (2013.01); *B32B 27/10* (2013.01); *D21J 1/08* (2013.01); *B65B 55/10* (2013.01)

(58) Field of Classification Search
CPC ............. A23L 3/10; B32B 27/10; D21J 1/08; B65B 55/10
USPC .......................................................... 428/34.2
See application file for complete search history.

(56) References Cited

U.S. PATENT DOCUMENTS

| 4,355,756 A * | 10/1982 | Furuya et al. .................. 229/4.5 |
| 5,527,622 A * | 6/1996 | Kato et al. ..................... 428/481 |
| 5,738,933 A * | 4/1998 | Koskiniemi et al. .......... 428/214 |

FOREIGN PATENT DOCUMENTS

JP          63237950 A  * 10/1988

* cited by examiner

*Primary Examiner* — Michael C Miggins
(74) *Attorney, Agent, or Firm* — Buchanan, Ingersoll & Rooney PC

(57) ABSTRACT

A folded moisture and heat resistant container is manufactured of a material of laminate type in the form of a sheet or a web, said laminate comprising at least a base layer (1), an outer coating (2) and an inner coating (3). The material is at least on one side thereof heat treated in an autoclave. In the material the case layer (1) consists of a liquid absorbing material, the outer coating (2) consists of a polymer selected from the group including polypropylene, oriented polypropylene, metalized high density polyethylene, linear low density polyethylene, unmodified polyester, metalized polyester and amorphous polyester, and the inner coating (3) consists of a polymer selected from the group including polypropylene, high density polyethylene, linear low density polyethylene, unmodified amorphous polyester.

1 Claim, 1 Drawing Sheet

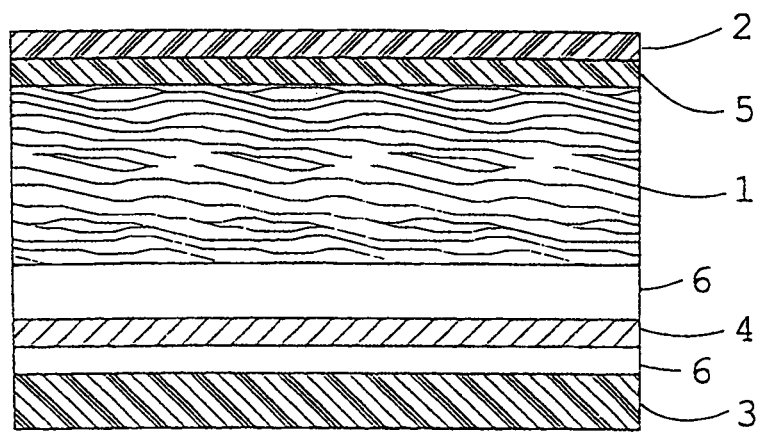

PACKAGING LAMINATES BASED ON CARDBOARD AND PAPER

CROSS-REFERENCE TO RELATED APPLICATIONS

This application is a continuation-in-part of U.S. application Ser. No. 08/983,588.

FIELD OF THE INVENTION

The present invention relates to a container which is manufactured from a material of laminate type in the form of a sheet or a web. More specifically the invention relates to a folded moisture and heat resistant container which is manufactured from a material of laminate type in the form of a sheet or a web, which material comprises a base layer, an outer coating and an inner coating, the material on at least one side thereof being heat treated in an autoclave.

BACKGROUND OF THE INVENTION

The demand on a container intended for foods is that it should be easy to manufacture and handle as well as be designed and constructed in such a way that it gives the best protection possible to the products which are to be filled and transported in the container. A good product protection implies among other things that the container should be sufficiently mechanically strong and dimensionally stable in order to withstand the outer influences which the container is exposed to during normal handling without the container being deformed or destroyed. Furthermore, the container should be sufficiently physically and chemically impermeable in order to prevent transport of liquid and/or gases through the walls of the container.

Paper and board are cheap package materials. However, they also have drawbacks in rapidly loosing their mechanical strength properties when exposed to liquid or moisture, which results in that a container containing these materials becomes flabby and cumbersome. It has thus been necessary to improve the properties of the material, either by coating or lamination.

Known packaging laminates of this kind comprise a base layer of paper or board, which gives the container strength and dimensional stability, as well as an outer layer of plastic, preferably polyethylene, which gives the container necessary impermeability properties against liquid and furthermore makes the packaging laminate heat sealable in such a way that two plastic layers facing each other easily can be sealed by the surfaces being melted together during the manufacturing of the container, whereby mechanically stable liquid impermeable sealing joints are formed.

In order to be able to use the packaging laminate in containers for products of different compositions, the laminate must be supplemented with at least one additional layer of a material with barrier properties, and the hitherto most used barrier material is a metal foil, preferably an aluminum foil (Al foil). Furthermore, an Al foil applied on the inside of the laminate must be covered by one or several plastic layers, usually polyethylene, in order to prevent contact between the Al-foil and the later on filled food.

It has thus always been a wish within the packaging technology to find alternative package materials in which liquid absorbing fiber layers are not used, these materials in practice thus being completely free from the disadvantages of the known package materials based on paper or cardboard.

Such a known alternative package material has for example a strengthening base layer of plastic and a filler intermixed with the plastic, and this material has proved to be less moisture sensitive than the previously used materials based on paper and cardboard.

Furthermore, it is often required that a container intended for food is constructed in such a way that it allows aseptic filling of a product which is sterilized and filled under sterile conditions in a likewise sterilized container which after filling is sealed in such a way that while stored before being consumed the filled product is not re-infected by harmful microorganisms.

Concerning the filled product, it has for a long time been known that the shelf life of a foodstuff can be prolonged by the foodstuff being subjected to a heat treatment which is so extensive that micro-organisms present in the foodstuff are completely killed or reduced in number. In order to achieve an adequate heat treatment the treatment must be performed in such a way that all parts of the treated product once and for all is heated to such an extent and for such a long time as is required for obtaining the desired killing or inactivation of microorganisms in the product.

A heat treatment for killing and/or inactivations of microorganisms can be accomplished by means of moist as well as dry heat. In the food industry a heat treatment in moist heat is preferred since the biological killing and inactivating mechanisms are much more effective at a high water content than at a low water content, i.e. dry heat. Besides, the heat transfer in the equipment used for heat treatment is much more effective with moist heat.

However, known containers of a packaging laminate with a liquid absorbing fiber layer cannot be used for heat treatment with moist heat without the desired mechanical rigidity of the packaging laminate and thus the dimensional stability of the container being impaired or lost.

SUMMARY OF THE INVENTION

The purpose of the invention is thus to provide a moisture and/or heat resistant packaging container made of a laminate material of the above mentioned type.

In order to achieve this purpose the packaging material according to the invention is formed from a laminate in the form of a sheet or a web which on at least one side thereof is heat treated in an autoclave. This laminate comprises at least one base layer consisting of a liquid absorbing material, an outer coating, and an inner coating. The outer coating consists of a polymer selected from the group consisting of polypropylene, oriented polypropylene, metalized oriented polypropylene, high density polyethylene, metalized high density polyethylene, linear low density polyethylene, unmodified polyester, metalized polyester and amorphous polyester. The inner coating consists of a polymer selected from the group consisting of polypropylene, high density polyethylene, linear low density polyethylene, unmodified polyester and amorphous polyester.

In order to explain the invention in more detail reference is made to the accompanying drawing.

BRIEF DESCRIPTION OF THE DRAWING

FIG. 1 schematically shows a cross section through a packaging laminate in the form of a sheet or a web according to the invention.

DETAILED DESCRIPTION OF THE INVENTION

Like conventional packaging laminates, the packaging laminate in FIG. 1 comprises a relatively thick strengthening base layer 1 as well as an outer coating 2 and an inner coating 3. An outer and an inner coating refers to a coating which is applied on the outside or the inside of the laminate, respectively.

The packaging laminate has as an essential part a base layer 1 of a liquid absorbing material. Other layers in the packaging laminate can also include liquid absorbing materials. However, these are not so important for the container stability as the base layer with its mechanical strength properties.

The liquid absorbing material in the base layer 1 preferably consists of paper or cardboard. Other water absorbing materials used in packaging laminates are for example ethylene/vinyl alcohol, i.e. an ethyl-vinyl alcohol copolymer (EVOH) and polyvinyl alcohol. These polymers rapidly loose their barrier properties if they are exposed to moisture.

It has surprisingly been shown that containers made of a laminate of the above mentioned type not only withstand the usual heat treatment but also a treatment under extreme conditions in a humid environment if the laminate with the above mentioned liquid absorbing base layer 1 also comprises the outer coating 2 as well as the inner coating 3 with the alternative components indicated below in the laminate layers. Furthermore, the cut edges on the packaging laminate in the completed container should be protected.

In order to withstand a strong influence of moisture in the form of water as liquid or steam the coatings 2 and 3 are according to the invention designed to be heat resistant and to have good vapor barriers. Thus, the outer coating 2 consists of a polymer which can be polypropylene, oriented polypropylene, metalized (usually with aluminum), oriented polypropylene, high density polyethylene, linear low density polyethylene, metalized high density polyethylene, unmodified or "clean" polyester, metalized (usually with aluminum) oriented polyester or amorphous polyester. The inner coating 3 consists of a polymer which can be polypropylene, high density polyethylene, linear low density polyethylene, unmodified polyester or amorphous polyester.

The material for the coating layers must be able to withstand the high temperatures of autoclaving which is approximately 105-122° C. Therefore, materials such as low density polyethylene are generally not used as a coating material due to its relatively low melting temperature which is approximately 102-112° C. The present invention uses higher melting polyethylenes capable of withstanding autoclavation. These polyethylenes include linear low density polyethylene which has a melting temperature of approximately 115-123° C. and high density polyethylene which has a melting temperature of approximately 123-135° C.

The polyester material, for example, may be polyethylene terephthalate, PET, i.e., a polyester which comprises terephthalic acid and ethylene glycol. In order to work in the coating process and not give rise to an off-flavor, a small amount about, 1.5-2.5 weight percent of glycol/cyclohexanedimethanol is added to this polyester. The main objective of this additive is to reduce the crystallinity rate of the material.

Preferably, the packaging laminate according to the invention also has a barrier layer 4 arranged between the base layer 1 and the inner coating 3, which barrier layer 4 is intended to be facing the filling material of the packaging container. The barrier layer can consist of aluminum, a silica coating, ethylene/vinyl alcohol, polyvinyl alcohol, metalized (usually with aluminum) oriented polypropylene, an aluminum oxide coating or metalized (usually with aluminum) oriented polyester, the polyester for example being polyethylene terephthalate.

Furthermore, the packaging laminate according to the invention can have a layer 5 arranged between the base layer and the outer coating 2, which layer 5 can consist of polypropylene, low density polyethylene, medium density polyethylene, high density polyethylene or amorphous polyester, the polyester for example being polyethylene terephthalate. An additional similar layer can be arranged on the other side of the base layer 1.

Finally, the packaging laminate according to the invention can have a coating 6 adjacent one or both sides of the barrier layer 4, which coating 6 can consist of an adhesive plastic, a heat sealable plastic (e.g. polyethylene), a primer or a lacquer. An additional layer can be incorporated between the base layer 1 and the adjacent coating 6, which layer then preferably consists of one of the above mentioned components for the layer 5.

Consumer containers ready for use and of throw-away type are according to known technology manufactured by folding from a web of a packaging laminate according to the invention to a tube in such a way that the two longitudinal edges of the web are joined in a longitudinal overlap seam. The tube is filled at 80-90° C. with the filling material in question and is divided into closed container units by repeated lateral sealing of the tube beneath the level of filling material in the tube. Container units filled by means of this web filling method are separated from each other by cuts in the transversal sealing zones and the desired geometrical final form is obtained by an additional forming and sealing operation.

The packaging laminate according to the invention is not only adapted to the above mentioned treatment but also to more drastic conditions including moisture and/or heat. Thus, containers manufactured from these laminates are very suitable for preservation by refrigeration as well as preservation by heat. When preservation by refrigeration is used these containers having solid and/or liquid filling material can be chilled by means of water cooling.

Furthermore, the laminate according to the invention has been shown to be very suitable for manufacturing dimensional stable impermeable packaging containers which can be used at highly extreme conditions in a humid environment including heat treatment with moist heat and a pressure above the atmospheric, at least one of the sides of the container being exposed to a humid atmosphere and heat treatment. Such harsh environments comprise autoclaving at temperatures and periods which are customary for foods. This means that the laminate is also extremely suitable to be used for producing a container which is intended for being filled with a product under aseptic conditions. In this connection the product is sterilized and filled under almost sterile conditions in a likewise sterilized container which after filling is sealed in such a way that during storage the filled product is not re-infected by micro-organism before it is consumed.

When such a packaging procedure, a so called hot fill, is used the filling material is thus filled according to known technology while still being hot in sterilized, preferably heat sterilized containers. Such a treatment results in that the container is exposed to moist heat at a temperature of the filling material of 75° C., preferably 90° C., or more.

During a subsequent cooling phase containers exposed to the above mentioned example of heat treatment will also be subjected to environments in which good sealing properties of the container against moisture and liquid are required. During the cooling phase the filling material is allowed to cool in the container which is manufactured from a laminate. This cooling can for example take place in a fluid bath and also by spraying with cold water, if necessary with accompanying cooling with $CO_2$ or $N_2$ in order to rapidly be able to achieve a sufficiently low temperature, such as 4° C.

The above mentioned harsh environments comprise autoclaving at temperatures and periods customary for food. In this connection autoclaving means sterilizing or killing micro-organisms in a vessel, in which the heating takes place under pressure usually with steam or air as a heat transfer medium.

At a temperature in the autoclaving vessel within the interval 105-121° C. an established reference temperature is chosen to be 121.1° C. (250° F.) and a z-value (a temperature alteration for changing the reduction time for a certain micro-organism with a factor 10) to be 10° C. The heat treatment value Fr which is determined in this area is often represented by $F_0$ ($F_0$=Fr, at 121° C.). The heat treatment value Fr is thus the combined lethal effects at the temperatures used in practice. When the temperature lies within the interval 90-105° C. during production a reference temperature of 93.3° C. (200° F.) and a z value of 10° C. are used. For pasteurization a reference temperature of 65.5° C. (150° F.) and a z value of 5° C. are used. Other standardized reference temperatures are used at special occasions.

Products included in a container according to the invention are not heat treated to a special Fr value, on the contrary to a certain center temperature guaranteeing a product which is sufficiently heat treated. (The position of the center point depends of course on the construction of the container as well as thee product in the container.)

Containers according to the invention have been shown to be useful for liquid products requiring an $F_0$ value of 3-5, for viscous/semi-solid products requiring an $F_0$ value of 6-10 and also for hard products requiring an $F_0$ value of 12-18, the $F_0$ values of course being dependent of the volume of the container.

While a number of embodiments of the invention have been described in detail above, it should be obvious to persons skilled in the art that various modifications and adaptations can be made without departing from the spirit of the invention and the scope of the appended claims.

What is claimed is:

1. A method for packaging and stabilizing a food product consisting essentially of the steps of:

providing an open container from a sheet or web comprising a laminate including a base layer formed from a liquid absorbing material selected from the group consisting of paper and cardboard, at least one outer layer comprising a first polymeric material and facing the outside of said container, at least one inner layer comprising a second polymeric material and facing the inside of said container and at least one barrier layer comprising aluminum between said base layer and said inner layer, said open container being formed by heat sealing the sheet or web to itself;

adding a food product to the inside of the open container under non-aseptic conditions;

closing the container opening and thereby sealing the inside of the container from exposure to external microbial attack;

exposing the outside of the container to moist heat at autoclaving temperature;

maintaining said exposure to said moist heat for a time sufficient to heat said container and said food product to a temperature providing stabilization of said food product via sterilization while simultaneously retaining a level of dimensional stability and mechanical strength in said container for transport and subsequent storage of said container; and thereafter allowing the container and the food product contained therein to cool, wherein said polymeric material in said inner and outer layers each has a melting point sufficiently high to withstand exposure to said moist heat in a manner consistent with said dimensional stability and mechanical strength of said sealed container, and wherein said inner layer polymeric material and said outer layer polymeric material are selected from the group consisting of polypropylene and oriented polypropylene.

\* \* \* \* \*